Patented Nov. 5, 1929

1,734,196

UNITED STATES PATENT OFFICE

HENRY BLUMENBERG, JR., OF MOAPA, NEVADA

PROCESS OF MAKING ALUMINUM CHLOROSULPHATE

No Drawing.   Application filed May 18, 1927. Serial No. 192,495.

My invention relates to a process of making aluminum chloro sulphate $AlClSO_4$.

Aluminum chloro sulphate is now being used in the mineral oil industry for refining and purifying crude and distilled mineral oil in their products. It is used in the same manner as aluminum chloride and requires from 2 to 5 per cent by weight of the oil to be treated, depending on the impurities and especially on the sulphur compounds present.

It is an object of this invention to provide a simple, efficient and economic process of making aluminum chloro sulphate, depending upon the reaction of aluminum oxide and aluminum sulphate with hydrochloric acid.

My invention consists of the steps of the process hereinafter described and claimed.

I take aluminum oxide and aluminum sulphate in the proportions indicated by the molecular formulas in the chemical equation which is to follow, and grind the same to 100 mesh screen and dehydrate the same to expel practically all of the water of crystallization.

The intimate mixture of the two aluminum compounds are then brought in contact with hydrochloric acid fumes, preferably in a revolving drum lined with refractory material. The hydrochloric acid fumes are introduced at a temperature approximately 130 to 180° F. at the other end of the drum, the latter being preferably provided with riffles, causing the aluminum compounds to be taken up during the rotation and to fall to the drum chamber by gravity, thus coming in intimate contact with the hydrochloric acid fumes passing therethrough. The aluminum chloro sulphate will be formed in accordance with the following equation:

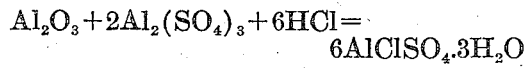
$$Al_2O_3 + 2Al_2(SO_4)_3 + 6HCl = 6AlClSO_4 \cdot 3H_2O$$

which, as well known, is crystalline, yellowish in color, slightly hygroscopic, and is then placed in air tight containers.

In place of the hydrochloric acid chlorine gas may be substituted, in which case, however, aluminum hydroxide is used in equivalent quantity for the aluminum oxide.

Various changes may be made in the steps of the process by those skilled in the art, without departing from the spirit of my invention, as claimed.

I claim:

1. A process of making aluminum chloro sulphate comprising treating a dehydrated mixture of aluminum oxide and aluminum sulphate with hydrochloric acid fumes.

2. A process of making aluminum chloro sulphate comprising treating a dehydrated mixture of aluminum oxide and aluminum sulphate with hydrochloric acid fumes at a temperature from 130 to 180° F.

In testimony whereof I have signed my name to this specification.

HENRY BLUMENBERG, JR.